(12) United States Patent
Siska

(10) Patent No.: US 7,319,985 B2
(45) Date of Patent: Jan. 15, 2008

(54) LOAN PRODUCT AND SYSTEM AND METHOD FOR PROVIDING AND MONITORING A LOAN PRODUCT

(76) Inventor: Thomas G. Siska, 2 Hitching Post Dr., Rolling Hills Estates, CA (US) 90274

( * ) Notice: Subject to any disclaimer, the term of this patent is extended or adjusted under 35 U.S.C. 154(b) by 839 days.

(21) Appl. No.: 09/813,745

(22) Filed: Mar. 21, 2001

(65) Prior Publication Data
US 2002/0138410 A1 Sep. 26, 2002

(51) Int. Cl.
*G06Q 40/00* (2006.01)
(52) U.S. Cl. .............................. 705/38; 705/35; 705/36; 705/37; 705/39
(58) Field of Classification Search ................. 705/35, 705/36, 37, 38, 39
See application file for complete search history.

(56) References Cited

U.S. PATENT DOCUMENTS

| 5,742,775 | A | * | 4/1998 | King ........................... 705/38 |
| 5,907,828 | A | | 5/1999 | Meyer et al. |
| 5,950,179 | A | * | 9/1999 | Buchanan et al. ............. 705/38 |
| 6,148,293 | A | | 11/2000 | King |
| 6,233,566 | B1 | * | 5/2001 | Levine et al. .................. 705/37 |
| 6,460,021 | B1 | | 10/2002 | Kirksey |
| 7,028,007 | B1 | | 4/2006 | Abrahams et al. |

| 2001/0056399 | A1 | 12/2001 | Saylors |
| 2002/0091630 | A1 | 7/2002 | Inoue |

FOREIGN PATENT DOCUMENTS

JP 2002073983 A 3/2002

* cited by examiner

*Primary Examiner*—Nga Nguyen
(74) *Attorney, Agent, or Firm*—Schwartz Cooper Chartered

(57) ABSTRACT

A method and a Loan product providing for Banks and other large Finance Companies (Intermediaries) to market and fund loan product to its Customers (Borrowers), whereby the entire loan processes are administered by a contracted Finance Company (Contractor) that possess loan, leasing and/or factoring (collectively referred to as a Loan) specialty expertise that the Intermediary does not have or cannot duplicate cost effectively. The Contractor will indemnify and/or insure the Intermediary from loss of principle and interest, thereby eliminating all risk to the Intermediary. Since the Intermediary provides money for the Loan, the cost will be in most cases lower than the cost of money the Contractor can provide directly. The Contractor is able to drastically reduce its marketing costs as volume gets funneled in from its customer Intermediaries. The Borrower benefits from having easier access to the various Loan products and a lower price due to this process. The Intermediary can now serve its customers better, employ funds more efficiently, earn fees for providing marketing services benefitting the Contractor, all while completely eliminating the risk of loss on the contracted Loans.

32 Claims, 4 Drawing Sheets

The Competition for the "monitored loan" continues until the Borrower chooses. The "unequal" competitors push their unique advantage. During good economic times when money is in abundance, one of the competitors will match the other's advantage, even to the detriment of themselves and the Borrower.

The Competition for the "monitored loan" will now occur between 'equal' competitors (Banks in conjunction with their contracted CFCs). The competitive advantages will be normal, market driven determinants such as speed of delivery, overall customer service, performance or volume pricing, etc.

FIG. 1B

FIG. 2A — LOAN MONITORING PROCESS (one example)

FIG. 2B – NEW MONITORING PROCESS (one example)

BANK IN CONJUNCTION WITH THEIR CONTRACTED CFC

54 — Borrower submits Collateral to Bank's processing center (either in hard copy or computer-to-computer via the internet or direct modem) which resides with the CFC.

56 — CFC reviews Collateral.

58 — CFC instructs Bank to fund money into Borrower's checking account.

60 — Borrower's Customers pay Accounts Receivable to Bank.

62 — CFC reduces 'advance' amount.

64 — Borrower submits updated Collateral as in Step 1.

66 — CFC instructs Bank to re-advance money into Borrower's account.

68 — Cycle continues for the length of the relationship.

LOAN PRODUCT AND SYSTEM AND METHOD FOR PROVIDING AND MONITORING A LOAN PRODUCT

DESCRIPTION

1. Technical Field

The present invention is generally directed to a loan product and to a system or method for collaboratively providing a full range of loan products, and more specifically, the invention is directed to a method of enabling an Intermediary to collaborate with a Contractor to provide a loan product in which the Contractor administers the loan product and indemnifies the Intermediary against risk.

2. Background of the Invention

Presently, Banks and large Finance Companies (herein "Intermediaries") and Niche Finance Companies (herein "Contractors") all provide loans, leases and/or factoring programs (herein "Loans") directly to Customers (herein "Borrowers"). Typically, Intermediaries have a money cost advantage over Contractors by virtue of their size and financial strength. In this regard, Banks have the further advantage of being Depository Institutions. Additionally, Intermediaries also have a marketing cost advantage over Contractors brought about by their "brick-and-mortar" branch networks and the positive perception Borrowers have in being a customer of a Bank or large Finance Company.

Because of the particular advantages Intermediaries possess over Contractors, Intermediaries tend to specialize in low cost (which assumes low risk) Loans. Due to the typically high quality of the Borrower or its collateral, such low cost Loans require no monitoring whatsoever, or only passive monitoring in some cases. Intermediaries will also compete for higher risk Loans (i.e., those requiring more active monitoring), especially when the economy is doing well.

Contractors typically enjoy advantages over Intermediaries in terms of products offered, geography (i.e., ability to service Borrowers without regard to physical location) and expertise in handling certain types of Loans. As such, Contractors tend to specialize in higher margin (which assumes higher risk) Loans. Part of the "higher" margin goes to Loan loss reserves, and part to more sophisticated Loan monitoring and structuring mechanisms required by the risky nature of the Borrower or its collateral. The remainder is higher profit for the higher risk (if all goes well). Contractors will also compete for lower risk Loans (those requiring passive monitoring), especially when Intermediaries invade the Contractor's territory during good economic times.

The fact that Intermediaries and Contractors offer different advantages to the market is helpful to address most every Borrower's needs. However, it becomes problematic when money is easily available (supply of money is high) and Borrowers' need to borrow lessens (demand for money is low), such as occurs during a good economy. During these healthy economic times, an Intermediary's desire to employ its abundance of funds causes it to take more risk, even without the expertise to do so profitably.

As Intermediaries pull Borrowers from a higher risk market with already decreased demand, Contractors lower their rates in an effort to keep business flowing. This reaction either lowers profits or forces under-funded loan loss reserves for the Contractors. As good economic times continue, the competition escalates to the point where margins are so low and risk so high that "bad" Loans are literally booked. The longer these conditions exist, the more "bad" Loans build up on the books of the lenders.

Some may argue that all of this competition is good for the Borrowers. However, history has proven that this is not the case.

While Borrowers may enjoy higher debt levels and lower prices as a result of the competition, as the economy slows, so do revenues. Thus, under normal debt levels, Borrowers' profits would suffer, but little else. However, under the higher debt levels offered by the "uneven" competitors, Borrowers have a difficult time meeting debt service payments. Intermediaries and Contractors with higher risk, lower returns, and under-funded loss reserves, declare Borrower defaults at a record pace. In other words, everyone loses.

One financial product popular in the late 1980's and early 1990's, called "Securitization," was an attempt to solve funding issues for both Contractors and Intermediaries. Entities could fund Loans and then subsequently securitize them (i.e., sell the Loans to a shell corporation owned in whole or in part by the entities initially providing the Loans); thereby removing the asset and corresponding liability from their books. This allowed lenders to fund more Loans without having to raise equity levels. As Securitization grew in popularity and competition increased, it was subsequently marketed as a "risk management" tool as well as a finance tool. However, "Securitization" actually increased risk because the same lender structured and monitored the Loan, and was ultimately on the hook for any losses. Only now, the lender was able to grow beyond the prudent level of its equity base. As such, in the late 1990's, the Securitization market collapsed as participants went bankrupt and their investors lost a lot of money.

Even with the Securitization failure fresh in their minds, the Intermediary community continues to dedicate resources in the search to leverage their distribution capabilities (i.e., marketing), and their main resource, low cost of funds, throughout the lending market. However, to do so successfully the Intermediaries need to find a way to manage (i.e., lower or eliminate) their risk.

During the same time that Loan Securitization became popular, several niche finance companies introduced "partnering programs" allowing Intermediaries to utilize their marketing and low cost funds in tandem with the Loan structuring and monitoring expertise of the niche finance company. These "partnering" products seemed to be an improvement over Securitization in that risk is shared between the participants. However, Intermediaries were earning less than half the revenue associated with the Loan while remaining exposed to at least half of the risk (and in some cases more than half of the risk). The niche finance companies that push these programs are, on the other hand, quite comfortable earning premium risk adjusted returns at the Intermediaries' expense.

Intermediaries are continuously looking for products that reduce or eliminate risk. Intermediaries are also interested in being able to provide a full range of Loan products for its customers, even in areas the Intermediary normally would avoid if acting solely on its own. For example, a particular Intermediary may on its own, avoid providing loans for a specific industry or market (e.g., construction loans).

According to the present invention, Intermediaries and Contractors can effectively collaborate to their mutual benefit, taking advantage of each other's strengths to provide a full range of loan products for the Intermediaries customers. This invention opens the door for increased access for the Contractors to the Borrowers, while eliminating risk for the Intermediaries. The lower cost of funds provided by the Intermediary makes the collaborative product more competitive while saving money for the Borrower.

SUMMARY OF THE INVENTION

The present invention is directed to all loan products not handled by or outside the expertise of an Intermediary, such as higher risk loans and niche lending, and to a system or method for providing the loan product through an Intermediary. The invention strategically links Intermediaries and Contractors together in the distribution to Borrowers of a single product line. The single product line addresses all of the Borrower's loan needs while accessing the specific advantages provided by the Intermediary and the Contractor. The result is a loan product that is easier to access by the Borrower (saving the Borrower time and money in obtaining the loan product), cheaper for the Borrower (in terms of rate or cost of the loan product), less risky for the Intermediary (in terms of possible default by the Borrower), and cheaper to market and fund for the Contractor (who utilizes the marketing resources and lower cost of funds of the Intermediary).

The present invention fulfills the Intermediaries desire to provide as many financing alternatives as its Customers want, while simultaneously enhancing the Contractors desire to market and fund its products as cost effectively as possible. The resulting product obtained by the collaboration between the Intermediary and the Contractor, fulfills the Borrower's desire to easily and cheaply access a full array of Loan products from one institution while eliminating risk for the Intermediary.

Although the idea of offering a full array of loan products through an Intermediary has been attempted before, such products have never been successful. This is because the Intermediary on its own, lacked the expertise and structure to profitably maintain certain types of loan products. Moreover, when partnered with other entities, the Intermediary still faced too much risk without enough return to justify the risk. As the Intermediaries suffered losses on such previously attempted loan products, the programs disappeared.

Until the present invention, an Intermediary has never been able to offer a loan product without facing any of the risk itself. By combining the biggest advantages of Intermediaries (built in marketing, and low cost of funds) and that of Contractors (loan servicing expertise), Borrowers can enjoy lower priced Loans while Intermediaries eliminate the risk and Contractors gain marketing power at little cost. Competitors (i.e., Intermediaries in conjunction with their Contractors) will now all compete on equal footing. In this regard, competition does not get eliminated, it merely gets shuffled around so that all market participants can benefit.

In accordance with one embodiment of the invention, a method of providing a loan to a Borrower comprises the step of offering a loan through a first institution. This first institution may be an Intermediary such as a bank. For example, it may be the Borrower's bank that the borrower uses for other banking needs. The method further includes providing the loan to the Borrower, preferably in the name of the first institution. That is, entering into a loan agreement with the Borrower. The method further includes the first institution providing money for the loan, and collaborating with a second institution for the second institution to monitor or administer the loan. This is done typically for a loan not presently offered by the first institution, such as higher risk loans where the borrower or its collateral require monitoring within the expertise of the second institution.

The second institution may be a Contractor, such as a commercial finance company ("CFC"), that has more experience dealing with and administering loans of this type. This may include setting aside money (i.e., loan loss reserves) in the case of defaults by borrowers.

As provided above, the method comprises obtaining the money provided for the loan from the first institution. Certain institutions, such as banks, typically have access to money at a low cost (as compared to that available to a commercial finance company). This step allows one or more of the parties to the transaction to benefit from such low cost. Additionally, the method includes obtaining indemnification for the first institution of all risk for providing the money for the loan. The indemnification may be obtained entirely from the second institution, or in part from the second institution with the remaining portion provided by a third party, such as an insurance company. The collaboration between the first institution and the second institution in this manner, allows the first institution to obtain the benefit of being able to provide the desired loan (and thus have a more complete line of products to offer) without the risk or administrative activity normally associated with such a loan. The second institution obtains the advantage of the typically greater marketing power of the first institution in reaching Borrowers. The second institution also obtains an advantage by being more price competitive by utilizing the first institutions lower cost of funds. The Borrower also obtains an advantage in being able to have easier access to all of the loan products it may require, as well as potential savings resulting from the collaboration. Although the loan product is offered through the first institution, the loan can be made in the name of the first institution or the second institution.

In a separate embodiment the invention is a method of providing a loan to a borrower comprising the steps of offering a loan through a first institution, providing the loan to the borrower, providing money for the loan; and monitoring or administering the loan by a second institution. The method further includes obtaining the money provided for the loan from the first institution, and providing indemnification for the first institution of all risk for providing the money for said loan. The indemnification may be obtained entirely from the second institution, or in part from the second institution and in part from a third party such as an insurance company.

In a still further embodiment, the invention is a method of distributing and monitoring a plurality of loan products marketed by an Intermediary company. The method comprises the steps of offering a plurality of loan products through an Intermediary company, the loan products including low risk loans and high risk loans that require differing levels of monitoring, marketing the plurality of loan products to a plurality of potential borrowers, providing a borrower a high risk loan, and collaborating with a Contractor to actively monitor the high risk loan. The Intermediary company, like the first institution, may be a banking institution. Similarly, the Contractor may be a commercial finance company.

The method further comprises the step of providing money for the high risk loan from the Intermediary company, and obtaining indemnification and/or insurance for the Intermediary company against risk associated with providing the money for the high risk loan. The Contractor may indemnify and/or insure the Intermediary company against 100% of the risk on its own, or partner with a third party, such as an insurance company, to collectively indemnify the Intermediary against 100% of the risk.

In yet a further embodiment of the invention, a method of providing and managing a loan product comprises the steps of offering a plurality of loan products through a bank to a plurality of potential Borrowers. The loan products may be a full range of products including loan products directly offered by the bank (i.e. loan products traditionally provided by the bank) and contracted loan products. "Contracted loan products" being those products not normally offered by the bank, that are intended to be administered by a Contractor. The method further comprises marketing of the plurality of loan products by the bank to the plurality of potential Borrowers, providing a contracted loan product to a borrower, and possibly obtaining collateral from the Borrower for the contracted loan product. Additionally, the method includes supplying money for the contracted loan product from the bank, collaborating with a commercial finance company to actively monitor or administer the high risk loan product provided to the Borrower; and obtaining indemnification and/or insurance for the bank against all risk associated with supplying money for the high risk loan product from the commercial finance company.

In a further embodiment the invention comprises a contracted loan product. The contracted loan product comprises money supplied from a first institution to a Borrower. The money supplied from the first institution is insured by a second institution against risk of default of the loan product by the Borrower, and the loan product is actively monitored or administered by the second institution. The product may also include collateral supplied by the Borrower for the money supplied from the first institution. Again, the first institution may be a bank and the second institution may be a commercial finance company.

In yet another embodiment the invention comprises a customer or borrower approaching its preferred Lender (i.e., Intermediary), the one that typically is easiest to access and cheapest to access, for a Loan. The Lender evaluating the needs of the customer, and identifying a Loan product not directly provided by the Lender. Because the Lender desires to service the customer's needs and not lose or damage its relationship with the customer, the method includes the Lender executing a contract for a Contractor to provide the Loan product to the customer in the Lender's name (i.e., a contracted loan). This fits in with the Contractor's desire to be made aware of customers in search of a Loan product that the Contractor provides without the expenditure required for marketing the Loan product. This so-called "Private Label Loan Product" may be less expensive for Borrowers than going directly to the a Contractor through the Contractor's sales and marketing department. Moreover, the Loan product provides the same margin (or better) for administering Contractors, and fee income or "risk adjusted" premium yields on funds employed or both to participating Intermediaries.

The method and Loan product, provides for a customer (i.e., Borrower) to obtain a Loan from an Intermediary through a Contractor, thus saving the Contractor sales and marketing expenses. The Intermediary funds the Loan per instructions from the servicing Contractor utilizing the Intermediary's low cost of capital. The Intermediary earns a risk-adjusted premium on funds employed for providing marketing services to the Contractor or earns a straight fee income, or a combination of both. The wire fees normally incurred when the funds originate from the Contractor's bank account, are avoided throughout the life of the Loan if the Intermediary is a Bank. If the Intermediary is a bank, it continues to earn interest on checking account balances of the Borrower. The Borrower's Loan costs are lower due to the expense savings and revenue enhancements provided by this method and product.

The Intermediary and Contractor will negotiate the Intermediaries marketing fees and/or risk adjusted premium earned on funds employed in the Loan. This can be on a contract wide basis or on a Loan-by-Loan basis. The Contractor provides risk guarantees either directly (e.g., through simple contract language, where the credit rating or financial condition of the Contractor is deemed by the Intermediary as supporting the Contractor's guarantee) or through a third party insurance contract acceptable by the Intermediary, or through a combination of both.

Further aspects of the invention are disclosed in the detailed description of the preferred embodiment, the drawings and the claims.

DETAILED DESCRIPTION OF THE PREFERRED EMBODIMENT

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1A:
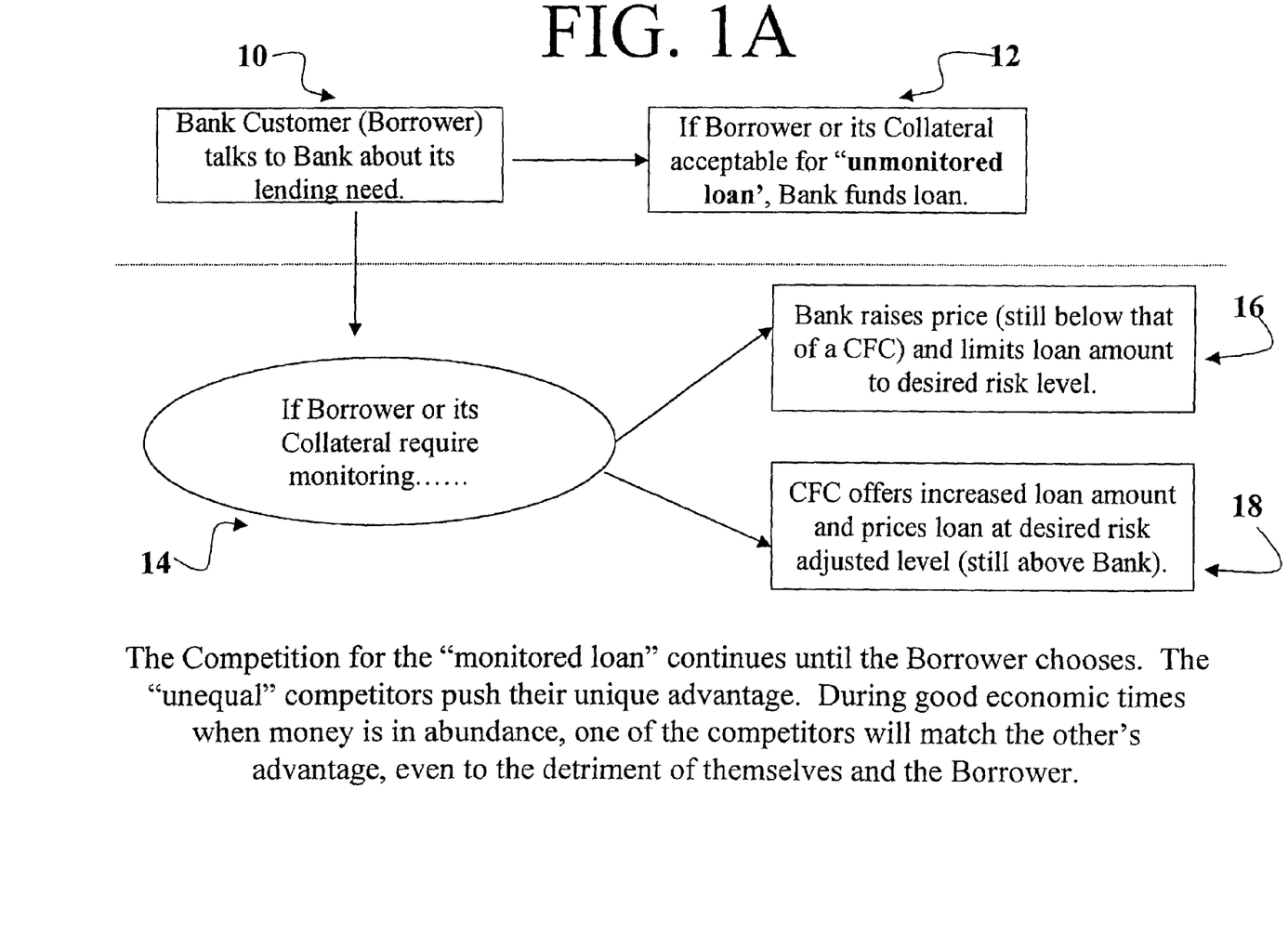
FIG. 1A is a schematic block diagram illustrating the present loan process as it exists in the market today.

Referring to FIG. 1A, typically a Borrower will initially contact an Intermediary, such as the Borrower's bank, about its lending needs as depicted in box 10. Box 12 depicts the situation where a Borrower requests a Loan that is deemed by the Intermediary to be within its present product line (i.e., risk appetite). Intermediaries are the best providers of low risk Loans because such Loans are the easiest to access and the cheapest due to the fact that Intermediaries possess the lowest cost of funds. In this regard, Borrowers are only willing to pay interest on a low risk Loan if the interest is low and the Loan is easy to obtain. Accordingly, such transactions are completed in the normal course of business.

Box 14 represents all Loan requests that are deemed risky enough to warrant expertise on the part of the Lender in administrating the Loan. As the market exists today, the Borrower has two primary options represented by boxes 16 and 18. The first option represented in box 16, is to obtain a Loan from the Intermediary. However, the Intermediary will then raise its price (e.g., rate of the loan), typically still below that of a Contractor such as a commercial finance company, and will limit the amount of the Loan to keep the risk to the Intermediary in line with the return.

The other option available to the Borrower, represented by box 18, is obtaining a Loan from a Contractor. This Loan is typically more expensive than the Loan available from the Intermediary, due to the Contractor's higher cost of funds, and the fact that the Contractor has to spend more money on marketing in order to locate Borrowers and to get Borrowers to entertain a higher cost Loan product. In order to compete, the Contractor will typically offer a larger Loan amount. In this regard, the increased risk to the Contractor is in line with the increased cost of the Loan.

The competition between unequal competitors, the Intermediary and the Contractor, for the "risky" Loan continues until the Borrower chooses. Each competitor push their own unique advantages to influence the Borrower's decision (i.e., an Intermediaries marketing and low cost of funds, and the Contractor's expertise and structure which allow for higher loan amounts). During good economic times when money is in abundance, one of the competitors will match the other's advantage and provide the Loan, even to the detriment of themselves and the Borrower.

As the situation presently exists, the Borrower must choose one Loan type (box 16) or the other (box 18), but cannot have both. Much time and money is expended on the part of the Borrower to ascertain what options are available and what tradeoffs must be made when choosing one product over the other.

Figure 1B:
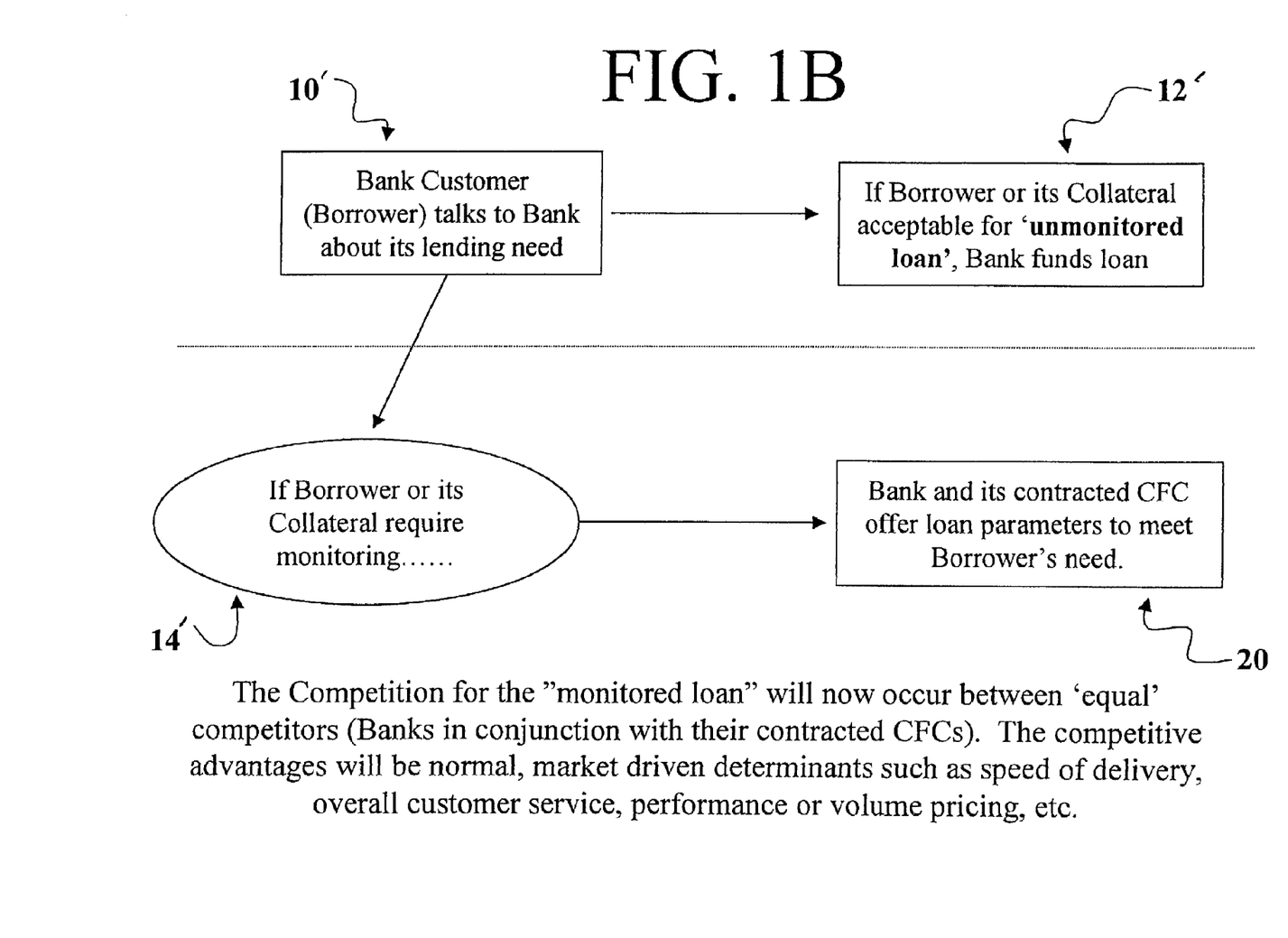
FIG. 1B is a schematic block diagram illustrating an embodiment of the present invention.

In accordance with the present invention, FIG. 1B illustrates the same initial scenario for low or no risk Loans with boxes 10' and 12'. However, for Loans that require expertise on the part of the Lender (i.e., the higher risk loans), as depicted in box 14', the Borrower only needs to deal with its Intermediary. As illustrated in box 20, an Intermediary (in this case a Bank) in conjunction with its Contractor (e.g., a CFC) collaborate to provide the appropriate Loan for the Borrower's need.

In accordance with the present invention, the Borrower can obtain a higher risk Loan, i.e., one requiring more active monitoring, from the Intermediary. The Intermediary collaborates or contracts with the Contractor for the Contractor to service or administer the Loan. In this regard, the Contractor uses its expertise in monitoring higher risk loans.

This arrangement takes advantage of each of the participant's strengths. The Contractor utilizes its expertise in monitoring and handling higher risk Loans. In this regard, the Contractor is specifically set-up to handle this higher risk (e.g., Contractor's are typically structured to have and maintain significant loan loss reserves in the case of Loan default). The Intermediary utilizes its typically superior marketing capability to provide Borrowers for the higher risk Loan products in which the Contractors specialize, and provides its low cost of fund. Thus alleviating the Contractors of the cost of marketing and higher cost of funds. These benefits derived by the Intermediary and the Contractor can be passed in part to the Borrower to lower the cost of the Loan and time spent finding the Loan.

The invention provides that the Intermediary is indemnified or insured against all risk associated with the Loan. This indemnification can be provided entirely from the Contractor. Alternatively, the indemnification can be provided in part by the Contractor, and in part by one or more third parties working with the Contractor. Thus, all of the risk is born by the Contractor (or the Contractor and the third parties), and not the Intermediary.

Figure 2A:
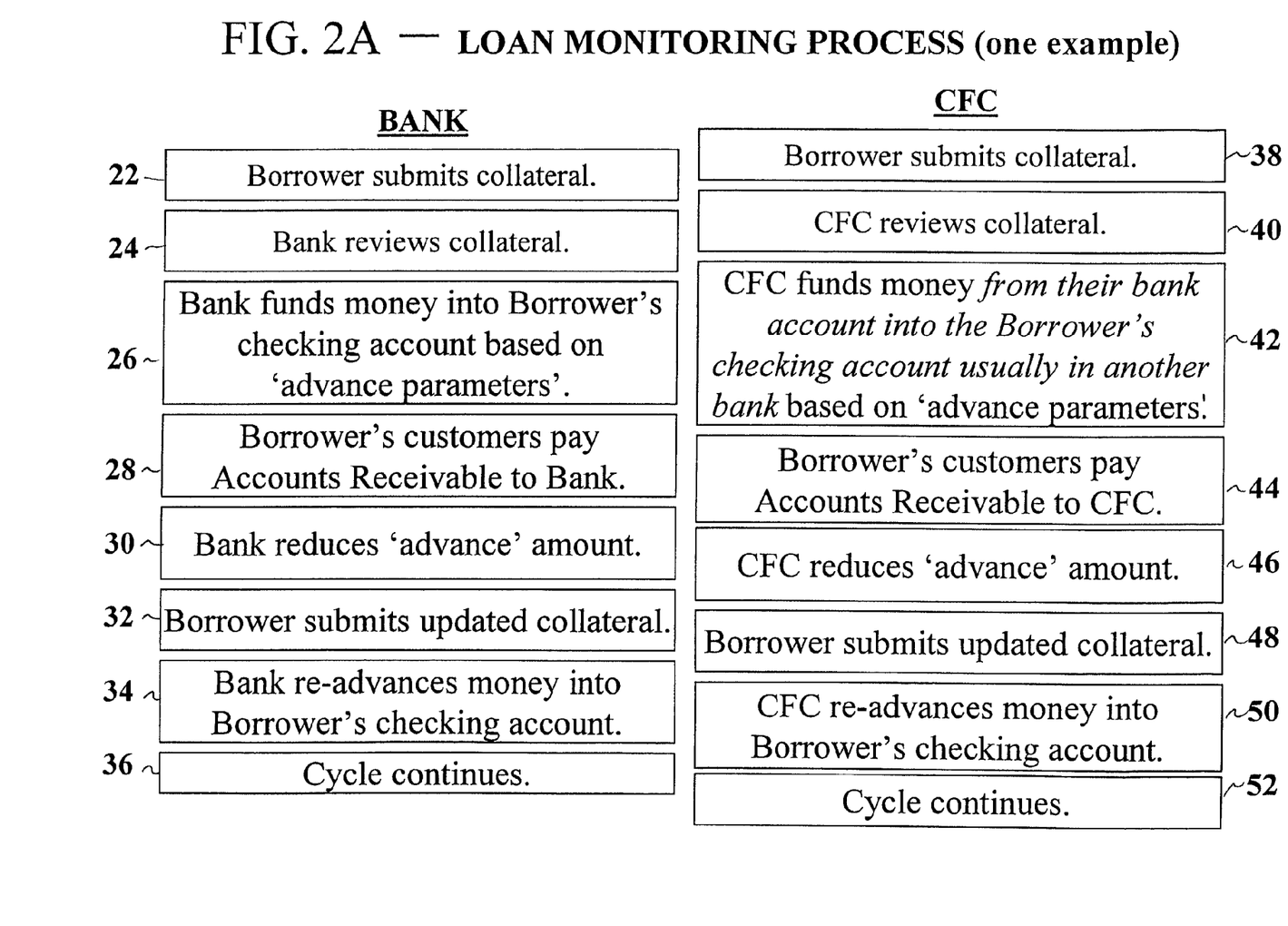
FIG. 2A is a schematic block diagram illustrating one example of a typical loan monitoring process (working capital line of credits) performed by an Intermediary and a Contractor.

FIG. 2A discloses a loan monitoring process as is typical for an Intermediary, such as a Bank (boxes 22-36), and a Contractor, such as a CFC (boxes 38-52). In both instances the Borrower submits collateral (boxes 22 and 38) which is reviewed (boxes 24 and 40) by the respective financial institution. In the case of a Bank, the Bank funds money into the Borrower's checking account based on certain advance parameters set up by the Bank (box 26). These parameters may include advance limits up to 40% of inventory and 80% of accounts receivable balance. During the course of the Loan, the Borrower (or its customers) pays back the Loan amount (box 28), which reduces the amount of the Loan advanced by the Bank (box 30). If the Borrower requires additional funds, the Borrower submits updated collateral (box 32), after which the Bank provides the additional funds (box 34). This cycle repeats (box 36) as necessary.

In the case of the CFC, the CFC funds money from the CFC's bank account into the Borrower's bank account which is typically in another bank, based on its advance parameters. These parameters may be the same or similar to the bank's parameter, or may include certain other items, such as advance limits up to 50% of inventory and 85% of accounts receivable balance. Similar to the bank, the CFC's customers pay back the Loan amount (box 44) which reduces the amount advanced (box 46). The Borrower may also submit updated collateral (box 48) to get additional funds (box 50). Again, this cycle is repeated as necessary (box 52).

Since Contractors are not banks, Borrowers cannot obtain money directly from the Contractors. Instead, the Contractors must send funds to the Borrower's bank. This inefficiency costs the participants money in two ways. First, wiring money from one bank to another generates wire fees that must be borne by either the Borrower or the Contractor. Second, part of a bank's revenue stream when making Loans is the interest earned by the Bank when holding a Borrower's money in the form of a non-interest or low interest bearing checking account. Since Contractors are not depository institutions, they cannot reap these benefits and must therefore make up for this loss of revenue by charging higher prices for their Loans or by making less money for the given risk taken.

Figure 2B:
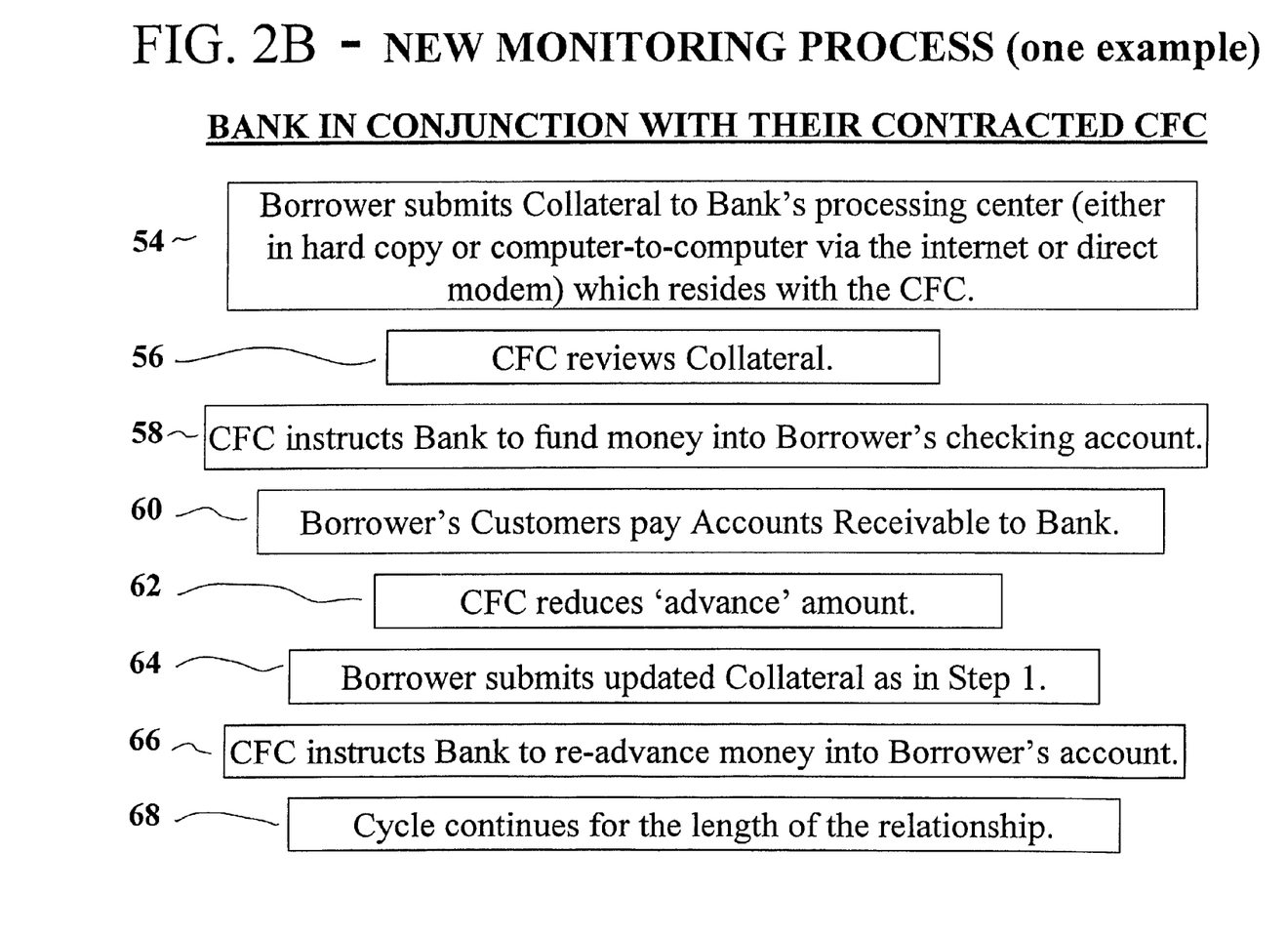
FIG. 2B is a schematic block diagram illustrating a loan monitoring process of an Intermediary collaborating with a Contractor in accordance with the present invention.

FIG. 2B is an example of a monitoring process in accordance with the present invention. A Borrower that needs the higher advance (as heretofor normally provided by the Contractor), can now obtain the advance without the burden of wire fees or loss revenue provided by interest earned on checking account balances when the Intermediary is the bank.

Preferably, the Borrower submits collateral to the banks processing center which resides with the Contractor (box 54). The Contractor reviews the collateral (box 56) and instructs the Intermediary to fund money into the Borrower's checking account (box 58). The Borrower or its customers, pay the Loan back to the Intermediary (box 60), and the Contractor reduces the advanced amount owed (box 62). The Borrower may submit updated collateral (box 64), after which the Contractor instructs the Intermediary to provide additional funds (box 66). Again, this process repeats as necessary for the length of the relationship (box 68).

In its preferred form, the present invention will allow for the first time one or more of the following advantages: (1) Intermediaries the ability to market Loans in the Intermediary's name even though the Intermediaries are not the direct provider of such Loans; (2) Intermediaries to earn fees or premium risk adjusted capital returns in exchange for the marketing service provided the Contractors; (3) Intermediaries to completely eliminate risk associated with a Loan product they distribute; (4) Borrowers to more easily secure loans, especially high risk loans not normally available through an Intermediary; (5) Borrower's to secure loans at a cost below that of Loans provided directly by Contractors; (6) Contractors to gain access to more Borrowers faster while reducing or eliminating marketing costs; (7) Contractors to fund Borrowers using the lower cost of funds provided from the Intermediary thereby making the product more competitive; and (8) Contractor's access is enhanced using the better or more well known name of the Intermediary.

Additional, less obvious benefits, can also be achieved with the present structure. For example, wire transfer fees (i.e., those previously incurred when a Contractor provided money for a loan) can be eliminated in those situations where the Intermediary is a bank. Also, Borrowers avoid the switching costs that would have occurred when circumstances changed, requiring the Borrower to jump from an Intermediary to a Contractor, or visa versa. Borrowers can also obtain standard Intermediary credit more easily because the Intermediary that distributes the Loan can monitor the Borrower's progress directly as an Intermediary customer (even though the Contractor administers the Loan). Further, Intermediaries that are Banks can increase revenues through earnings on account balances holding the Loans. Intermediaries also enjoy intangible benefits resulting from improved customer service by providing customers more product options and increasing their total customer base.

While specific embodiments have been illustrated and described, numerous modifications are possible without departing from the spirit of the invention, and the scope of protection is only limited by the scope of the accompanying claims.

I claim:

1. A method of providing a loan to a borrower comprising the steps of:
   offering a loan to a borrower through a first institution;
   providing said loan to said borrower;
   providing money for said loan by the first institution;
   collaborating with a second institution for said second institution to monitor and administer said loan;
   obtaining said money provided for said loan from said first institution;
   delivering said money to said borrower; and,
   obtaining indemnification for said first institution of all risk for providing said money for said loan from the second institution.

2. The method of claim 1 further comprising the step of: obtaining said loan in the name of the first institution.

3. The method of claim 1 wherein said indemnification is obtained entirely from said second institution.

4. The method of claim 1 wherein said indemnification is obtained in part from said second institution and in part from an insurance company.

5. The method of claim 1 wherein said first institution is a bank.

6. The method of claim 1 wherein said second institution is a commercial finance company.

7. The method of claim 1 further comprising said first institution marketing said commercial loan to a plurality of commercial borrowers.

8. The method of claim 7 wherein said loan provided to said borrower is a loan not presently offered by said first institution.

9. The method of claim 1 wherein said loan is a high risk loan.

10. The method of claim 1 further comprising said first institution marketing said loan to a plurality of potential borrowers.

11. The method of claim 10 further comprising said second institution obtaining a competitive advantage from said marketing by said first institution.

12. The method of claim 1 further comprising said second institution obtaining a competitive advantage from said providing of money by said first institution.

13. The method of claim 3 further comprising said first institution obtaining a competitive advantage from said obtaining indemnification from said second institution.

14. The method of claim 1 further comprising the step of:
   obtaining collateral for said loan from the borrower;
   reviewing said collateral by said second institution; and,
   instructing said first institution to provide money for said loan by said second institution after said reviewing of said collateral.

15. A method of providing a loan to a borrower comprising the steps of:
   offering a loan through a first institution;
   providing said loan to said borrower;
   providing money for said loan;
   obtaining said money provided for said loan from said first institution;
   funding an account of the borrower with the first institution with said money obtained from said loan;
   providing indemnification for said first institution of all risk for providing said money for said loan from the second institution; and,
   administering said loan by a second institution.

16. The method of claim 15 further comprising the steps of:
   obtaining said loan in the name of said second institution.

17. The method of claim 15 further comprising obtaining said indemnification entirely from said second institution.

18. The method of claim 15 further comprising obtaining said indemnification in part from said second institution.

19. The method of claim 15 wherein said first institution is a bank.

20. The method of claim 15 wherein said second institution is a commercial finance company.

21. The method of claim 15 further comprising said first institution marketing said commercial loan to a plurality of commercial borrowers.

22. The method of claim 15 wherein said loan provided to said borrower is a high risk loan.

23. The method of claim 15 wherein said loan is a product not presently offered by said first institution.

24. The method of claim 15 further comprising the steps of:
   obtaining collateral for said loan from the borrower;
   reviewing said collateral by said second institution; and,
   instructing said first institution to provide money for said loan by said second institution after said reviewing of said collateral.

25. A method of distributing and monitoring a plurality of loan products marketed by an Intermediary company comprising the steps of:
   offering a plurality of loan products through an Intermediary company, said loan products including loans provided directly by said Intermediary company and loans not provided directly by said Intermediary company;
   marketing said plurality of loan products to a plurality of potential borrowers;
   supplying a borrower a first loan not directly provided by said Intermediary company;
   collaborating with a Contractor to actively monitor said loan;
   providing money for said first loan from said Intermediary company;

delivering said money to said borrower; and, obtaining indemnification for said Intermediary company against all risk associated with providing money for said first loan from said Contractor.

26. The method of claim 25 further comprising the step of: providing said first loan in the name of said Intermediary company.

27. The method of claim 25 wherein said Contractor directly provides indemnification for said Intermediary company against 100% of said risk associated with said providing money for said first loan.

28. The method of claim 25 wherein said Contractor providing indemnification for said Intermediary company against part of said risk associated with said providing money for said first risk loan.

29. The method of claim 25 wherein said Intermediary company is a bank.

30. The method of claim 25 wherein said Contractor is a commercial finance company.

31. A method of providing and managing a loan product comprising the steps of:
    offering a plurality of loan products through a bank to a plurality of potential borrowers, said plurality of loan products including loan products directly managed by said bank and contracted loan products;
    marketing of said plurality of loan products by said bank to said plurality of potential borrowers;
    providing a contracted loan product to a borrower;
    supplying money for said contracted loan product from said bank;
    collaborating with a commercial finance company to administer said contracted loan product provided to said borrower; and
    obtaining indemnification for said bank against all risk associated with said supplying money for said contracted loan product from said commercial finance company.

32. The method of claim 31 further comprising obtaining collateral from said borrower for said contracted loan product; reviewing the collateral submitted by said borrower by said commercial finance company, wherein the step of supplying money for said contracted loan product is based on said reviewing the collateral submitted by said borrower by said commercial finance company.

* * * * *